(No Model.)
J. M. HARTMAN.
BLAST FURNACE.
No. 500,387. Patented June 27, 1893.
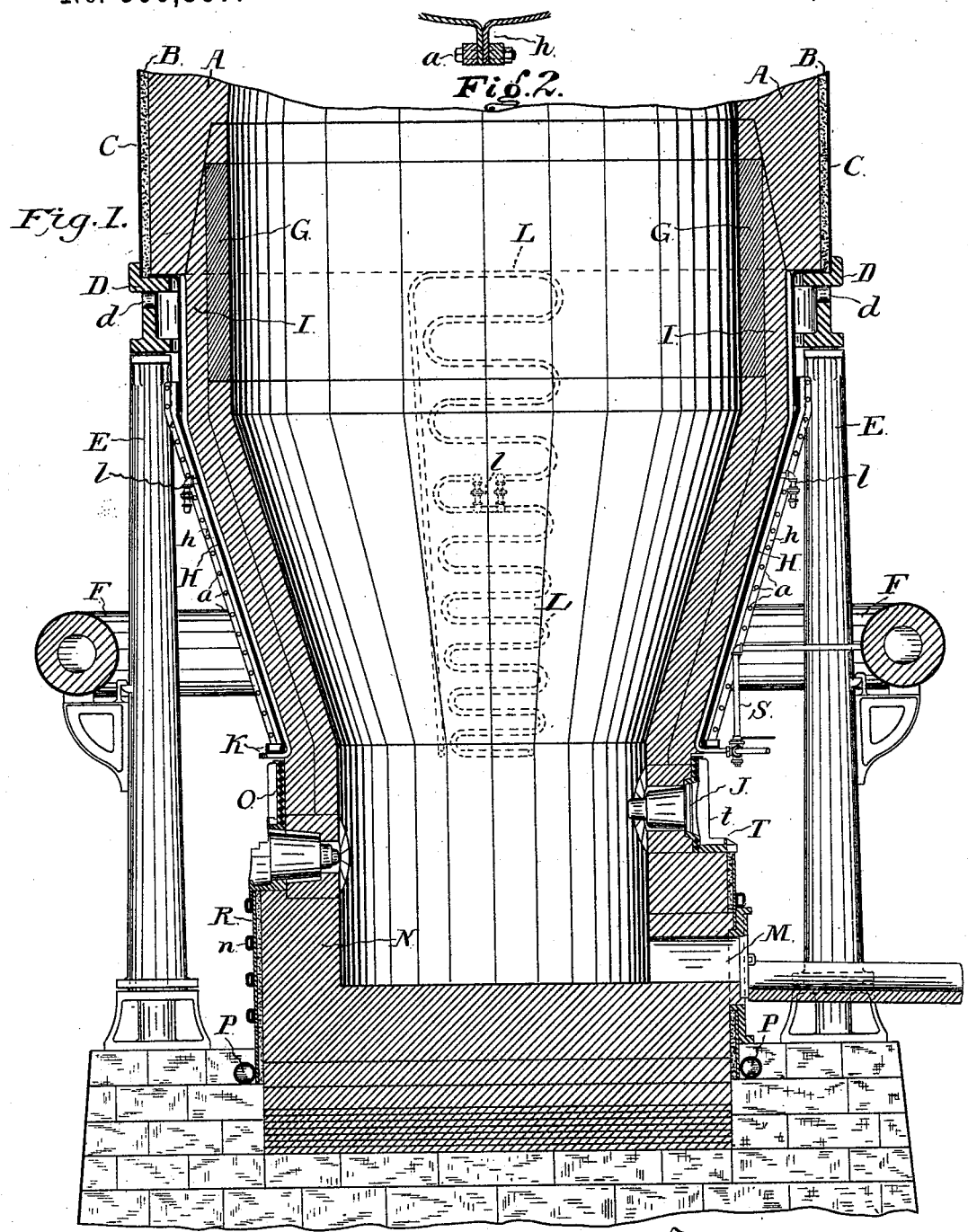
Witnesses:
James H. Bell
Henry N. Paul Jr.
Inventor
John M. Hartman
By Hollingsworth & Ohley
Attorneys

UNITED STATES PATENT OFFICE.

JOHN M. HARTMAN, OF PHILADELPHIA, PENNSYLVANIA.

BLAST-FURNACE.

SPECIFICATION forming part of Letters Patent No. 500,387, dated June 27, 1893.

Application filed March 21, 1889. Serial No. 304,192. (No model.)

*To all whom it may concern:*

Be it known that I, JOHN M. HARTMAN, of the city of Philadelphia and State of Pennsylvania, have invented certain new and useful Improvements in Blast-Furnaces, whereof the following is a specification, reference being had to the accompanying drawings.

In said drawings Figure 1, represents a partial vertical section through the center of a furnace containing my improvements, and Fig. 2, is a detail view showing the construction of the joints in the bosh jacket. Fig. 3 is an enlarged view, in elevation, showing one of the connections between sections of the water coils around the bosh, portions only of the coils being shown.

The primary object of my improvements is to prolong the life and efficiency of the furnace, and at the same time to facilitate the control, and for the better understanding thereof I deem it best to mention certain conditions which are found in the present practice.

In the practical operation of a blast furnace for reducing the oxides of iron to a metal, the hearth and bosh are filled with incandescent fuel, above which a stratum of ore and flux, say three to four feet deep, mixed with the fuel, constitute the zone of fusion. In this zone the reduced iron melts out of the ore, runs in shots down through the incandescent fuel below, and, passing through the cinder blanket in the hearth, is caught in the crucible, where it is protected from the blast by the cinder blanket. In the zone of fusion the earthy matters in the ore unite with the limestone, and trickling down through the fuel collect in the hearth over the iron, and as they accumulate, are drawn off through the cinder notch. The heighth of the zone of fusion above the tuyeres (other conditions remaining constant) is fixed by the volume of the blast blown. From the top of the tuyeres upward for a distance of four or five feet, the walls melt away quickly under the intense heat. In this region an atmosphere of carbonic acid and carbonic oxide and some free air exists; generally speaking it has an oxidizing tendency. Three to four feet above this zone a carbonic oxide atmosphere alone is found, the heat in this region being sufficient to fuse the cinder, (which melts at about 3,500°, while the iron melts at 2,500°,) and while not so high as that immediately below, melts away the walls also. The temperature of the zone of fusion again, is still lower, on an average, but the walls fuse away rapidly, as the lime in the flux attacks and corrodes them. This corrosion of the walls forms a sticky cinder which, when the furnace cools, adheres to the walls and forms ring scaffolds, causing irregular work. Above the zone of fusion, where the heat is still less, there is still a tendency for some distance up to fuse the walls, and when the furnace was working too hot, with the thick walls formerly used, retaining the heat, melted back badly. In the crucible the walls melt away until they reach the cooling influence of the air outside. The hearth quickly melts down from three to four feet, leaving a pool of untouched iron at all times therein. The brick work of the hearth is massive and retains the necessary heat to keep the iron fluid until drawn off. In event of continued leakage of a tuyere or colder blast, or a stoppage, the great surface of the massive hearth walls conducts the heat off through the ground chilling the cinder and iron in the hearth and crucible. The furnace will only make white iron under these conditions, and all iron has to be drawn off at the cinder notch, which being up closer to the tuyeres, is kept open by the high heat. The hearth has then to be melted out slowly, as it takes time to get the heat to strike down through the chilled mass, often from three to eight weeks.

Heretofore furnaces have been built with thick walls and considerable backing from the mantel up, or where the bosh wall joins the furnace wall. Back of this thick wall, often forty inches thick, there was a space of five inches filled with sand; next to this a red brick wall of thirteen and a half inches, then a space of six inches filled with loam, then a nine inch red brick wall against the shell of the furnace. The bosh and crucible walls have varied from thirty to forty-eight inches in thickness. When these thick walls melted back the furnace was so much enlarged that the engines, boilers and stoves had not the capacity to handle the furnace and irregular work followed resulting in the blowing out of the furnace for relining. With these thick walls and slow driving the walls retained this shape for some time, but when the first irregular work occurred the walls melted out, first one side and then the other and left the furnace out of shape so that it rarely made a good product afterward. The mantels have been placed from eight to eighteen feet above the hearths according to the size of the furnace.

It will be noted that with the old arrangement of walls where the bosh joined the furnace walls there was a double thickness of wall which melted away above the junction of the two walls and left a ridge that caused scaffolds to form. At present furnaces are being blown with double the volume of blast used in the above described plant. This larger volume makes a hotter fire, the blast pressure is increased and the wear and tear is increased. To overcome the difficulties incident to the former method of construction I build as follows:—Referring to the drawings, A, represents the main lining wall of the furnace stack proper, which is constructed of fire brick, say about thirty inches in thickness, down to the level of the mantel D, which, in a seventeen foot furnace should be about twenty-four feet above the hearth. The wall A, above the mantel is surrounded by an iron shell C, with an open space between, say of two inches, packed with mineral wool, which permits the expansion of the walls and prevents the bursting of the shell. It also prevents any flow of gas through the furnace wall. The top of the mantel is well up above the bosh and from the point where the main lining wall A, terminates, down to the bosh, I construct the lining I, of a thickness not exceeding eighteen inches and surround it with an iron jacket extending from the top of the mantel downward. The bosh flares inwardly at an angle, say of seventy-five degrees, and its wall is also constructed about eighteen inches in thickness. The mantel D, rests on pillars E, and as its very considerable depth would prevent the ready access of air to the adjacent wall I, the mantel girders are perforated at short intervals with air holes $d$, which permit air circulation.

In accordance with principles which are now well understood, and for whose embodiment in practical form my application for Letters Patent was filed June 4, 1884, (being Serial No. 116,413,) I so proportion the furnace as to throw the zone of fusion well up above the top of the bosh, or in that portion where the wall I, is substantially vertical, as shown in the drawings, and I line the interior surface adjacent to the zone of fusion with plumbago bricks G. These bricks have a very slight percentage of clay in them, not more than enough to make the brick plastic before burning, they are much more refractory than the usual fire brick, resist the action of the flux, and withstand the heat better, so long as no free air touches them to burn them. Since the atmosphere in the neighborhood of the zone of fusion is non-oxidizing, they are available for use in that vicinity, but must not extend down sufficiently near the tuyeres for the blast to reach them.

The bosh jacket H, consists of a series of iron plates joined together by vertical flanges $h$. These flanges have very considerable depth as shown in Fig. 2, and they are secured together by bolts or clamps, placed along the outer edge of the flange and thereby leaving that portion between them and the fillet free to expand under pressure from within.

Between the bosh wall and the bosh jacket it has been customary to use cooling pipes shaped like an inverted U, or siphon having vertical legs closer together at the top than at the bottom. A pipe of this shape, however, gives too much cooling surface at the top and not enough below; furthermore, the cooling effect being limited to the immediate vicinity of the pipes, vertical spaces are left between them, where the bricks melt out so as to form grooves in the interior. To overcome this, I construct a series of coils L, of serpentine form with the main portions horizontal, as shown. I mass the coil or give it the greatest number of turns in the vicinity of the tuyere, and reduce, or spread it apart, as it nears the top. This arrangement of the coil retains the wall of a more uniform thickness while the horizontal disposition of the pipes prevents any vertical grooves being made in the lining of the furnace, by the downward flow of the melted material, or the upward rush of the hot gas. The water coils L, around the bosh are formed in sections, each section being continuous throughout its length thereof, but passing out through the jacket and coupled to the next one externally thereto as shown at $l$, so that there are no joints within the jacket, and thus the risk from leakage is greatly diminished. I prefer to fill the space between the bosh and its jacket and around the coils L, with broken fire brick and fire clay. Around the region of the tuyeres J, is placed an iron jacket O, with water cooled coils close together to prevent any melting of the walls. This I term the tuyere jacket and at the bottom thereof I place a water trough T, suspended upon brackets $t$, attached to the tuyere jacket, and extending over the thick walls N, of the hearth. From the tuyere jacket, down to about three feet below the hearth bottom, is placed a heavy wrought iron jacket R, surrounding the crucible and between it and the wall of the crucible is a space of about two inches, which is filled with gravel. When it is desired to cool the hearth walls, water is allowed to overflow from the edge of the trough T, down through the gravel and chill the wall.

Heretofore crucible jackets have been constructed with water coils cast in them, but the liquid iron, working through the walls, is liable to escape and cut the coils, causing disastrous explosions. To avoid this while obtaining the necessary cooling effect, I secure to the outside of the crucible jacket a series of water cooled passages $n$ made of bronze or other metal of high conducting power with a flat side secured in direct contact with the jacket so as to give the maximum cooling surface.

In the event of a chill occurring in the bosh, I provide a pipe S, which leads from the hot blast pipe F, to the serpentine coils L, in order that the water may be shut off and the hot blast turned on to restore the needed heat. As the temperature of the hearth determines the quality of the iron, it is necessary to keep it also at the proper degree. When the furnace works too hot the iron is liable to melt the walls and escape into the ground where it sometimes breaks out with destructive effects. To avoid this I place a pipe P, in the masonry around the bottom of the crucible; said pipe having a convenient inlet and leading to an outlet in the chimney. When the furnace is working too hot, cold air is admitted to the pipe P, and is drawn up by the chimney draft, thus preventing the hearth from burning out too rapidly. If on the other hand the hearth is chilled, I connect the pipe P, with a small petroleum furnace or other source of heat, and allow the flame or heat products of combustion to be drawn through the pipe so as to impart heat to the bottom of the hearth.

Having thus described my invention, I claim—

1. The combination, with the crucible jacket, of a series of flat channels for water circulation, constructed of metal having a higher heat conducting power than the metal of the jacket, and arranged outside of, and in immediate contact with the same, substantially as set forth.

2. The combination with the crucible, of a surrounding jacket extending from a point near the tuyeres down into the hearth, said jacket being open at the top and having an open space between it and the crucible wall; a filling of gravel or other porous material intermediate between said jacket and said crucible wall; a tuyere jacket arranged above said crucible jacket and a water trough suspended from said tuyere jacket and arranged to discharge into said opening between the crucible jacket and the crucible, substantially as and for the purposes set forth.

3. The combination, with the hearth, of a pipe surrounding the hearth and embedded in the foundation, said pipe being connected with a chimney or other source of draft, and provided with means substantially as set forth, whereby either hot or cold air can be forced through the same to restore heat to, or cool down said hearth and foundation, substantially as set forth.

JOHN M. HARTMAN.

Witnesses:
JAMES H. BELL,
E. REESE.